(12) United States Patent
Iyer et al.

(10) Patent No.: US 8,909,687 B2
(45) Date of Patent: Dec. 9, 2014

(54) EFFICIENT FIR FILTERS

(75) Inventors: Srinivasan Iyer, Austin, TX (US);
Carsten Aagaard Pedersen, Cambridge, MA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 419 days.

(21) Appl. No.: 13/354,304

(22) Filed: Jan. 19, 2012

(65) Prior Publication Data

US 2013/0191431 A1 Jul. 25, 2013

(51) Int. Cl.
*G06F 17/15* (2006.01)

(52) U.S. Cl.
USPC .......................... 708/420; 708/319

(58) Field of Classification Search
None
See application file for complete search history.

(56) References Cited

U.S. PATENT DOCUMENTS

| | | | | |
|---|---|---|---|---|
| 3,748,451 A | * | 7/1973 | Ingwersen | 708/420 |
| 6,385,635 B1 | * | 5/2002 | Ishii | 708/603 |
| 8,239,442 B2 | * | 8/2012 | Lerner | 708/603 |
| 2010/0036898 A1 | * | 2/2010 | Lerner | 708/230 |
| 2011/0153705 A1 | * | 6/2011 | Kuo et al. | 708/313 |
| 2013/0191431 A1 | * | 7/2013 | Iyer et al. | 708/420 |

* cited by examiner

*Primary Examiner* — David H Malzahn
(74) *Attorney, Agent, or Firm* — Winston Hsu; Scott Margo

(57) ABSTRACT

A processor for calculating a convolution of a first input sequence of numbers with a second input sequence of numbers to generate an output sequence is provided. The processor includes multipliers, each multiplying two real numbers to generate an output; multiplexers to direct the numbers in the first and second input sequences or parts of the numbers to the multipliers; and control circuitry to control the multiplexers to direct the first and second input sequences of numbers to the multipliers dependent on whether the numbers are complex or real. An accumulator adds partial products from multiplications performed by the multipliers to calculate the convolution.

24 Claims, 4 Drawing Sheets

EFFICIENT FIR FILTERS

BACKGROUND

The present disclosure relates to efficient finite impulse response filters.

A digital signal processor (DSP) can perform many types of signal processing, such as processing audio and/or video signals, using algorithms that involve a large number of mathematical operations performed on a large set of data. Compared to general-purpose microprocessors, digital signal processors can perform a narrower range of tasks, but can execute signal processing algorithms more efficiently with a lower latency and lower power consumption. This makes digital signal processors suitable for use in portable devices, such as mobile phones. A digital signal processor may include program memory that stores programs, data memory that stores the information to be processed, and one or more computing engines that perform math processing based on the program from the program memory and the data from the data memory. Examples of signal processing that can be efficiently performed by digital signal processors include audio compression and decompression, image compression and decompression, video compression and decompression, filtering of signals, spectrum analysis, modulation, pattern recognition and correlation analysis.

SUMMARY

In general, in one aspect, an apparatus includes a processor to calculate a convolution of a first input sequence of numbers with a second input sequence of numbers to generate an output sequence. The processor includes multipliers, each multiplying two real numbers to generate an output; multiplexers to direct the numbers in the first and second input sequences or parts of the numbers to the multipliers; and control circuitry to control the multiplexers to direct the first and second input sequences of numbers to the multipliers dependent on whether the numbers are complex or real. When each of the first sequence of numbers is a complex number and each of the second sequence of numbers is a real number, the control circuitry controls the multiplexers to direct the first and second input sequences of numbers to the multipliers to enable a first multiplication and a second multiplication to be performed in parallel. The first multiplication includes a first complex number in the first input sequence multiplied by a real number in the second input sequence, and the second multiplication includes a second complex number in the first input sequence multiplied by the real number in the second input sequence. An accumulator is provided to add partial products from the multiplications to calculate the convolution.

Implementations of the apparatus may include one or more of the following features. The processor can include a first register to store the first complex number in the first input sequence, a second register to store the second complex number in the first input sequence, and a third register to store the real number in the second input sequence. The control circuitry can control the multiplexers to direct the real number to each of a first multiplier, a second multiplier, a third multiplier, and a fourth multiplier, and control the multiplexers to direct a real part of the first complex number to the first multiplier, direct an imaginary part of the first complex number to the second multiplier, direct a real part of the second complex number to the third multiplier, and direct an imaginary part of the second complex number to the fourth multiplier. When each of the first sequence of numbers is a real number and each of the second sequence of numbers is a real number, the control circuitry can control the multiplexers to direct the first and second input sequences of numbers to the multipliers to enable a first multiplication of a first real number in the first input sequence with a real number in the second input sequence, a second multiplication of a second real number in the first input sequence with the real number in the second input sequence, a third multiplication of a third real number in the first input sequence with the real number in the second input sequence, and a fourth multiplication of a fourth real number in the first input sequence with the real number in the second input sequence, the first, second, third, and fourth multiplications being performed in parallel. The processor can include pipeline stages for calculating the convolution, and for a portion of the time the pipeline generate a partial product per operating cycle. The processor can include registers to store some of the first and second input sequences of numbers, and the control circuitry can control the multiplexers to direct the numbers stored in the registers to the multipliers. When each of the first and second sequences of numbers is a complex number, the control circuitry can control loading of one or more of the first and second input sequences of numbers into the registers and control the multiplexers to direct the first and second input sequences of numbers to the multipliers to enable outputting a product of a complex number in the first input sequence and a complex number in the second input sequence every cycle for a period of time. The first input sequence of numbers can include input samples to a digital filter, the second input sequence of numbers can include filter coefficients, and the output sequence can include an output of the digital filter in response to the input samples.

In general, in another aspect, a method of calculating a convolution of a first input sequence of numbers with a second input sequence of numbers to generate an output sequence is provided. The method includes identifying a first input sequence of numbers and a second input sequence of numbers; and directing the first and second input sequences of numbers to a plurality of multipliers according to whether the numbers are complex or real, each multiplier capable of multiplying two real numbers to generate an output. The method includes, when each of the first sequence of numbers is a complex number and each of the second sequence of numbers is a real number, directing a first complex number in the first input sequence of numbers, a second complex number in the first input sequence of numbers, and a real number in the second input sequence of numbers to the multipliers, and performing a first multiplication and a second multiplication in parallel, the first multiplication including multiplying the first complex number in the first input sequence with the real number in the second input sequence, the second multiplication including multiplying the second complex number in the first input sequence with the real number in the second input sequence. The method includes accumulating partial products to calculate a convolution of the first input sequence and the second input sequence.

Implementations of the method may include one or more of the following features. The first input sequence of numbers can include input samples to a digital filter, the second input sequence of numbers can include filter coefficients, and the convolution can represent an output of the digital filter in response to the input samples.

In general, in another aspect, a method of multiplying numbers includes identifying a first input sequence of numbers and a second input sequence of numbers; and directing the numbers in the first and second input sequences or parts of the numbers to a plurality of multipliers according to whether the numbers are complex or real, each multiplier capable of multiplying two real numbers to generate an output. The method includes, when each of the first sequence of numbers is a complex number and each of the second sequence of numbers is a real number, directing a first complex number in the first input sequence of numbers, a second complex number in the first input sequence of numbers, and a real number in the second input sequence of numbers to the multipliers, and performing a first multiplication and a second multiplication in parallel, the first multiplication including multiplying the first complex number in the first input sequence with the real number in the second input sequence, the second multiplication including multiplying the second complex number in the first input sequence with the real number in the second input sequence.

Implementations of the method may include one or more of the following features. The first input sequence of numbers can include input samples to a digital filter, the second input sequence of numbers can include filter coefficients. The method can include accumulating partial products to calculate a convolution of the first input sequence and the second input sequence, the convolution representing an output of the digital filter in response to the input samples.

In general, in another aspect, an apparatus includes a processor to calculate a convolution of input samples with filter coefficients to generate a filter output response, the processor including a multiplier-accumulator unit that includes multipliers, each to multiply a first input number and a second input number to generate a product; and multiplexers to receive the input samples and the filter coefficients and to direct the input samples and filter coefficients to the multipliers according to instruction codes specifying a computation mode. The processor is capable of executing instructions to perform computation in at least two computation modes. In a first computation mode, each input sample is a complex number and each filter coefficient is a complex number, and the multiplexers direct the input samples and filter coefficients to the multipliers to enable multiplication of a complex input sample with a complex filter coefficient. In a second computation mode, each input sample is a complex number and each filter coefficient is a real number, and the multiplexers direct the input samples and filter coefficients to the multipliers to enable a first multiplication of a first complex input sample with a real filter coefficient, and a second multiplication of a second complex input sample with the real filter coefficient, the first and second multiplications being performed in parallel.

Implementations of the apparatus may include one or more of the following features. The processor can execute instructions to perform computation in a third computation mode in which each input sample is a real number and each filter coefficient is a real number, and the multiplexers can direct the input samples and filter coefficients to the multipliers to enable a first multiplication of a first real input sample with a real filter coefficient, a second multiplication of a second real input sample with the real filter coefficient, a third multiplication of a third real input sample with the real filter coefficient, and a fourth multiplication of a fourth real input sample with the real filter coefficient, the first, second, third, and fourth multiplications being performed in parallel. The multiplier-accumulator unit can include four multipliers, and in the third computation mode, the multiplexers can direct the real filter coefficient to each of the four multipliers, direct the first real input sample to a first one of the four multipliers, direct the second real input sample to a second one of the four multipliers, direct the third real input sample to a third one of the four multipliers, and direct the fourth real input sample to a fourth one of the four multipliers. The multiplier-accumulator unit can include registers to store operands, and the multiplexers can direct the operands or parts of the operands to the multipliers. In the first computation mode, one of the registers can store one complex input sample, and in the third computation mode, the register can store two real input samples. The multiplier-accumulator unit can include at least four multipliers. In the second computation mode, the multiplexers can direct the real filter coefficient to each of the four multipliers, direct a real part of the first complex input sample to a first one of the four multipliers, direct an imaginary part of the first complex input sample to a second one of the four multipliers, direct a real part of the second complex input sample to a third one of the four multipliers, and direct an imaginary part of the second complex input sample to a fourth one of the four multipliers. The multiplier-accumulator unit can include registers to store operands, and the multiplexers can direct the operands or parts of the operands to the multipliers. In the second computation mode, one of the registers can store one complex input sample and another one of the registers can store two real filter coefficients. The multiplier-accumulator unit can include pipeline stages. The multiplier-accumulator unit can use an input sample to calculate an intermediate product of a first term of the filter output response in a first cycle, and reuse the same input sample to calculate an intermediate product of a second term of the filter output response in a second cycle.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
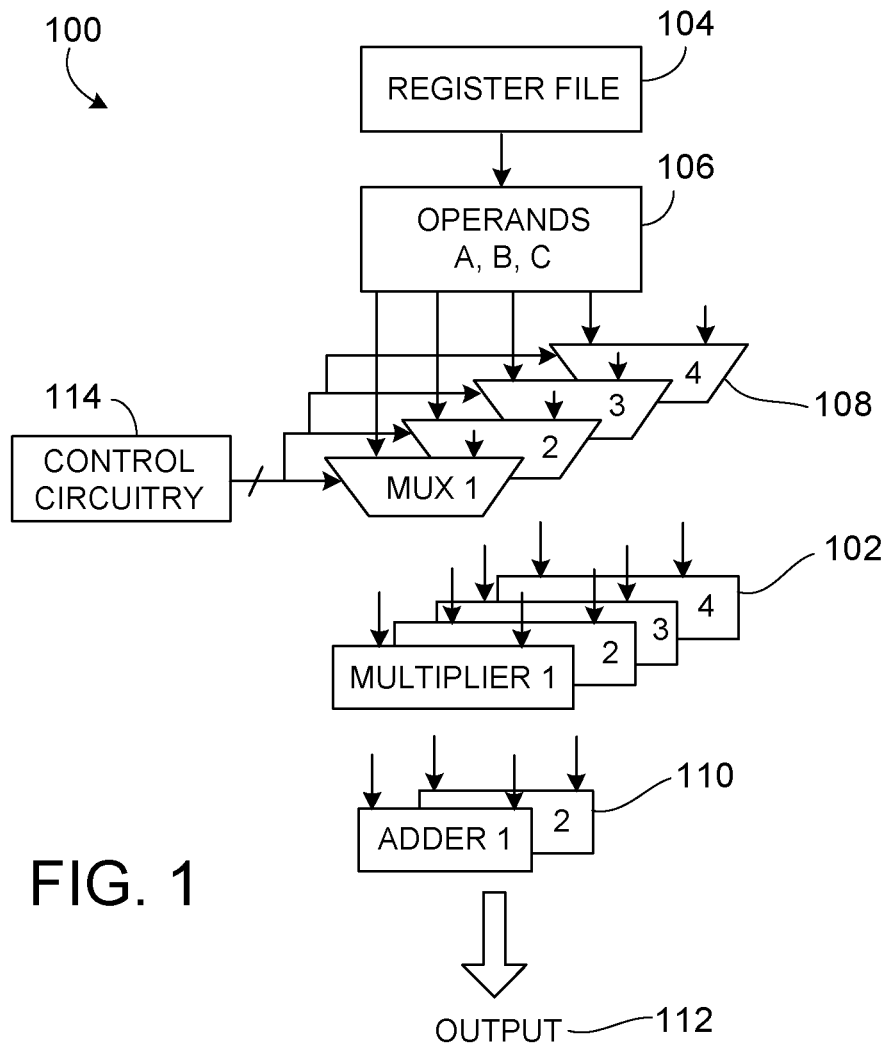
FIG. 1 is a block diagram of an example complex multiplier-accumulator (CMAC) unit.

Referring to FIG. 1, in some implementations, a digital signal processor has a complex multiplier-accumulator (CMAC) unit 100 that includes at least four multipliers 102 for performing multiplication operations on complex and real numbers. A complex number has real and imaginary parts. When performing a multiplication of two complex numbers, four multipliers are used to calculate the product terms of the real and imaginary parts of the two complex numbers. When performing a multiplication of two real numbers, one multiplier is used. When performing a multiplication of a real number and a complex number, two multipliers are used to calculate the products of the real number by the real and imaginary parts of the complex number.

In order to more fully utilize the multipliers 102 when calculating real by complex multiplications, the CMAC unit 100 can be configured to use the four multipliers to perform two multiplication operations in parallel, in which each multiplication involves a complex number multiplied by a real number. The CMAC unit 100 can also be configured to use the four multipliers to perform four multiplication operations in parallel, in which each multiplication involves a real number multiplied by a real number. This is useful if the digital signal processor performs a series of multiplications, and some of the operands are real numbers, and some of the operands are used more than once. Examples of such operations include using the digital signal processor to implement a digital finite impulse response (FIR) filter, in which either input samples to the filter are real numbers, or the filter coefficients are real numbers or both. To more fully utilize the multipliers, the calculations for implementing the FIR filter are arranged to allow two or more multiplications of input samples and filter coefficients to be performed in parallel.

In some examples, the CMAC unit 100 includes a register file 104 that stores operands to be processed by the CMAC unit 100. The operands are stored in registers 106 and sent to multiplexers 108, which direct the real and imaginary parts of the complex numbers to the appropriate multipliers 102. The multiplexers 108 are controlled by control circuitry 114, based on the instruction being executed. The control circuitry 114 may control the multiplexers 108 differently depending on whether the operands are complex or real numbers. Each multiplier 102 can multiply two real numbers and send the product to an accumulator 110, which have adders that sum up the products and generate an output 112. In some implementations, the CMAC unit 100 has pipeline stages such that during some periods of time (e.g., when the pipeline is full), the CMAC unit 100 processes one complex by complex, two complex by real, or four real by real multiplications per clock cycle.

Figure 2:
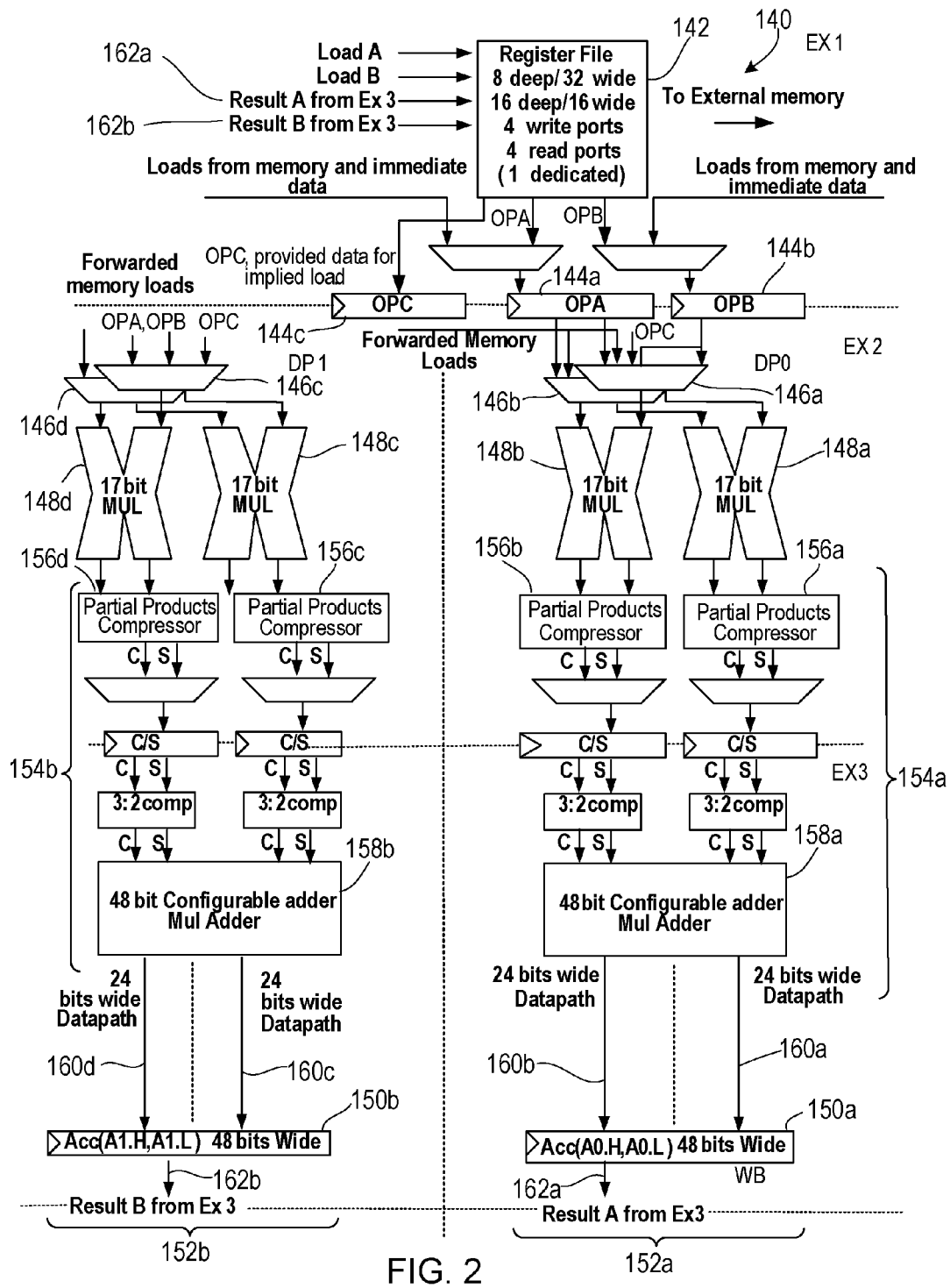
FIG. 2 is a schematic diagram of an example implementation of a MAC unit.

Referring to FIG. 2, as an example, one implementation of the CMAC unit 100 is CMAC unit 140, which can perform calculations on 32-bit operands. The CMAC unit 140 includes a register file 142 that has eight entries for storing 32-bit operands, or sixteen entries for storing 16-bit operands. Registers 144a, 144b, and 144c store three operands, e.g., operand A, operand B, and operand C, respectively. Two pipelines 152a and 152b operate on the operands in parallel. In the pipeline 152a, two multiplexers 146a and 146b multiplex the operands or parts of the operands and direct them to the inputs of multipliers 148a and 148b. In the pipeline 152b, two multiplexers 146c and 146d multiplex the operands or parts of the operands and direct them to the inputs of multipliers 148c and 148d. Each multiplier 148 can receive two 16-bit numbers. As an example, for a multiplication of a first complex number $x_r+x_i \cdot i$ ($x_r$ being the real part and $x_i$ being the imaginary part) and a second complex number $y_r+y_i \cdot i$ ($y_r$ being the real part and $y_i$ being the imaginary part), the multiplexers can send $x_r$ and $y_r$ to the multiplier 148a, $x_i$ and $y_i$ to the multiplier 148b, $x_r$ and $y_i$ to the multiplier 148c, and $x_i$ and $y_r$ to the multiplier 148d.

The multipliers 148a to 148d multiply the numbers provided by the multiplexers 146a to 146d to generate partial products. In the example above, the multiplier 148a calculates $x_r*y_r$, the multiplier 148b calculates $x_i*y_i$, the multiplier 148c calculates $x_r*y_i$, and the multiplier 148d calculates $x_i*y_r$.

Logic circuit 154a, which includes partial products compressors 156a, 156b and a 48-bit configurable adder 158a, processes the partial products in the pipeline 152a in a more compact format to generate outputs 160a and 160b that are provided to an accumulator 150a, which generates a 48-bit output 162a, representing the real part of the product $(x_r+x_i)*(y_r+y_i)$. A0.H, which is the upper 24 bits in the accumulator 150a, stores the partial product $x_r*y_r$. A0.L, which is the lower 24 bits in the accumulator 150a, stores the partial product $x_i*y_i$.

Logic circuit 154b, which includes partial products compressors 156c, 156d and a 48-bit configurable adder 158b, processes the partial products in the pipeline 152b in a more compact format to generate outputs 160c and 160d that are provided to an accumulator 150b, which generates a 48-bit output 162b, representing the imaginary part of the product $(x_r+x_i)*(y_r+y_i)$. A1.H, which is the upper 24 bits in the accumulator 150b, stores the partial product $x_r*y_i$. A1.L, which is the lower 24 bits in the accumulator 150b, stores the partial product $x_i*y_r$.

A feature of the CMAC unit 140 is that the four multipliers 148a to 148d can calculate the multiplication of a real number and a first complex number, and the multiplication of the same real number and a second complex number in parallel. For example, register 144a can store a first complex number $x=x_r+x_i$, register 144b can store a second complex number $y=y_r+y_i$, and half of register 144c can store a real number c. The multiplexers 146a to 146d can multiplex x, y, and c such that the multiplier 148a receives $x_r$ and c, the multiplier 148b receives $x_i$ and c, the multiplier 148c receives $y_r$ and c, and the multiplier 148d receives $y_i$ and c. The accumulator 150a provides the product x*c, in which A0.H=$x_r$*c and A0.L=$x_i$*c. The accumulator 150b provides the product y*c, in which A1.H=$y_r$*c and A1.L=$y_i$*c.

In some examples, the first and second complex numbers x and y are input samples to an FIR filter, the real number c is a coefficient of the FIR filter, and the products x*c and y*c are terms of the filter response.

Another feature of the CMAC unit 140 is that the four multipliers 148a to 148d can calculate the multiplication of a first real number, a second real number, a third real number and a fourth real number, by a fifth real number in parallel. For example, register 144a can store real numbers x0 and x1, register 144b can store real numbers x2 and x3 and register 144c can store real number c. The multiplexers 146a to 146d can multiplex x0, x1, x2, x3, and c such that the multiplier 148a receives x0 and c, the multiplier 148b receives x1 and c, the multiplier 148c receives x2 and c, and the multiplier 148d receives x3 and c. The accumulator 150a provides the products x0*c and x1*c, in which A0.H=x0*c and A0.L=x1*c. The accumulator 150b provides the products x2*c and x3*c, in which A1.H=x2*c and A1.L=x3*c.

In some examples, the real numbers x0, x1, x2 and x3 are input samples to an FIR filter, the real number c is a coefficient of the FIR filter, and the products x0*c, x1*c, x2*c, and x3*c are terms of the filter response.

In some implementations, the digital signal processor is configured to execute a set of instructions that specify how the operands or parts of the operands stored in the registers 144a to 144c are multiplexed and provided to the multipliers 146a to 146d. As described below, by carefully designing the instructions, the CMAC unit 140 can efficiently implement a finite impulse response (FIR) filter by reusing operands and more fully utilizing all four multipliers 148a to 148d in the calculations. The instructions optimize the hardware resources for different scenarios (e.g., real or complex number filter inputs, and real or complex number filter coefficients), leading to lower power consumption while achieving higher throughput.

Case0: Complex Input with Complex Coefficients

The instructions allow the digital signal processor to perform a regular complex multiplication:

$$C = A \cdot B \Rightarrow C_r = A_r \cdot B_r - A_i \cdot B_i, C_i = A_r \cdot B_i + A_i \cdot B_r$$

The instructions also provide options to allow the digital signal processor to perform complex multiplication with conjugation of any operand when the appropriate option is selected:

$$C = A \cdot B^* \Rightarrow C_r = A_r \cdot B_r + A_i \cdot B_i, C_i = A_i \cdot B_r - A_r \cdot B_i$$

$$C = A^* \cdot B \Rightarrow C_r = A_r \cdot B_r + A_i \cdot B_i, C_i = A_r \cdot B_i - A_i \cdot B_r$$

$$C = A^* \cdot B^* \Rightarrow C_r = A_r \cdot B_r - A_i \cdot B_i, C_i = -A_r \cdot B_i - A_i \cdot B_r$$

Figure 3:
FIG. 3 is a diagram of a digital filter.

Referring to FIG. 3, in some implementations, an FIR filter 170 receives an input signal x(n) and calculates the convolution of the input signal x(n) with filter coefficients c(k) representing the impulse response of the FIR filter, producing a filtered output signal y(n). For example, the convolution may be defined by:

$$y(n) = \sum_{k=0}^{K-1} x(n-k) \cdot c(k),$$

where c(k) are the coefficients of the FIR filter. As an example, in order to calculate y(8, . . . , 11) for K=6, we need to calculate the following sum of products:

$$y(8) = \sum_{k=0}^{5} x(8-k) \cdot c(k) \quad \text{(Equ. 1)}$$
$$= x_8 \cdot c_0 + x_7 \cdot c_1 + x_6 \cdot c_2 + x_5 \cdot c_3 + x_4 \cdot c_4 + x_3 \cdot c_5$$

$$y(9) = \sum_{k=0}^{5} x(9-k) \cdot c(k)$$
$$= x_9 \cdot c_0 + x_8 \cdot c_1 + x_7 \cdot c_2 + x_6 \cdot c_3 + x_5 \cdot c_4 + x_4 \cdot c_5$$

$$y(10) = \sum_{k=0}^{5} x(10-k) \cdot c(k)$$
$$= x_{10} \cdot c_0 + x_9 \cdot c_1 + x_8 \cdot c_2 + x_7 \cdot c_3 + x_6 \cdot c_4 + x_5 \cdot c_5$$

$$y(11) = \sum_{k=0}^{5} x(11-k) \cdot c(k)$$
$$= x_{11} \cdot c_0 + x_{10} \cdot c_1 + x_9 \cdot c_2 + x_8 \cdot c_3 + x_7 \cdot c_4 + x_6 \cdot c_5$$

The filter inputs and coefficients can be complex or a combination of real and complex numbers. When the inputs and coefficients are both complex, the sum of products term appear as follows:

$$y_r = x_r * c_r - x_i * c_i, \quad y_i = x_r * c_i + x_i * c_r.$$

Such computations can be performed by loading one of the registers 144 with a complex filter input, and loading another one of the registers 144 with a complex filter coefficient. The multiplexers 146 direct real and imaginary parts of the filter input and the filter coefficient to the multipliers 148 to calculate $x_r * c_r$, $x_i * c_i$, $x_r * c_i$, and $x_i * c_r$.

One way to calculate $y_8, \ldots, y_{11}$ for K=6 is to calculate $y_8 = x_8 \cdot c_0 + x_7 \cdot c_1 + x_6 \cdot c_2 + x_5 \cdot c_3 + x_4 \cdot c_4 + x_3 \cdot c_5$, which involves calculating $x_8 * c_0$, $x_7 * c_1$, $x_6 * c_2$, $x_5 * c_3$, $x_4 * c_4$, and $x_3 * c_5$ using the multipliers 148, then adding $x_8 * c_0$, $x_7 * c_1$, $x_6 * c_2$, $x_5 * c_3$, $x_4 * c_4$, and $x_3 * c_5$ using the accumulator. After completing the calculation of $y_8$, $y_9 = x_9 * c_0 + x_8 * c_1 + x_7 * c_2 + x_6 * c_3 + x_5 * c_4 + x_4 * c_5$ is calculated in a similar manner. The terms $y_{10} = x_{10} \cdot c_0 + x_9 \cdot c_1 + x_8 \cdot c_2 + x_7 \cdot c_3 + x_6 \cdot c_4 + x_5 \cdot c_5$ and $y_{11} = x_{11} \cdot c_0 + x_{10} \cdot c_1 + x_9 \cdot c_2 + x_8 \cdot c_3 + x_7 \cdot c_4 + x_6 \cdot c_5$ are then calculated.

The inventors realized that some of the operands are used in calculating both $y_n$ and $y_{n+1}$, n=8 to 10. Thus, for all real valued inputs instead of calculating $y_8$, $y_9$, $y_{10}$, and $y_{11}$ one after the other, it is more efficient to calculate $y_8$ to $y_{11}$ in parallel and reuse the operands in the calculations. Also, for complex valued inputs and real filter coefficients instead of calculating $y_8$, $y_9$, $y_{10}$, and $y_{11}$ one after the other, it is more efficient to calculate $y_8$ to $y_{11}$ in pairs and reuse the operands in the calculations.

Figure 4:
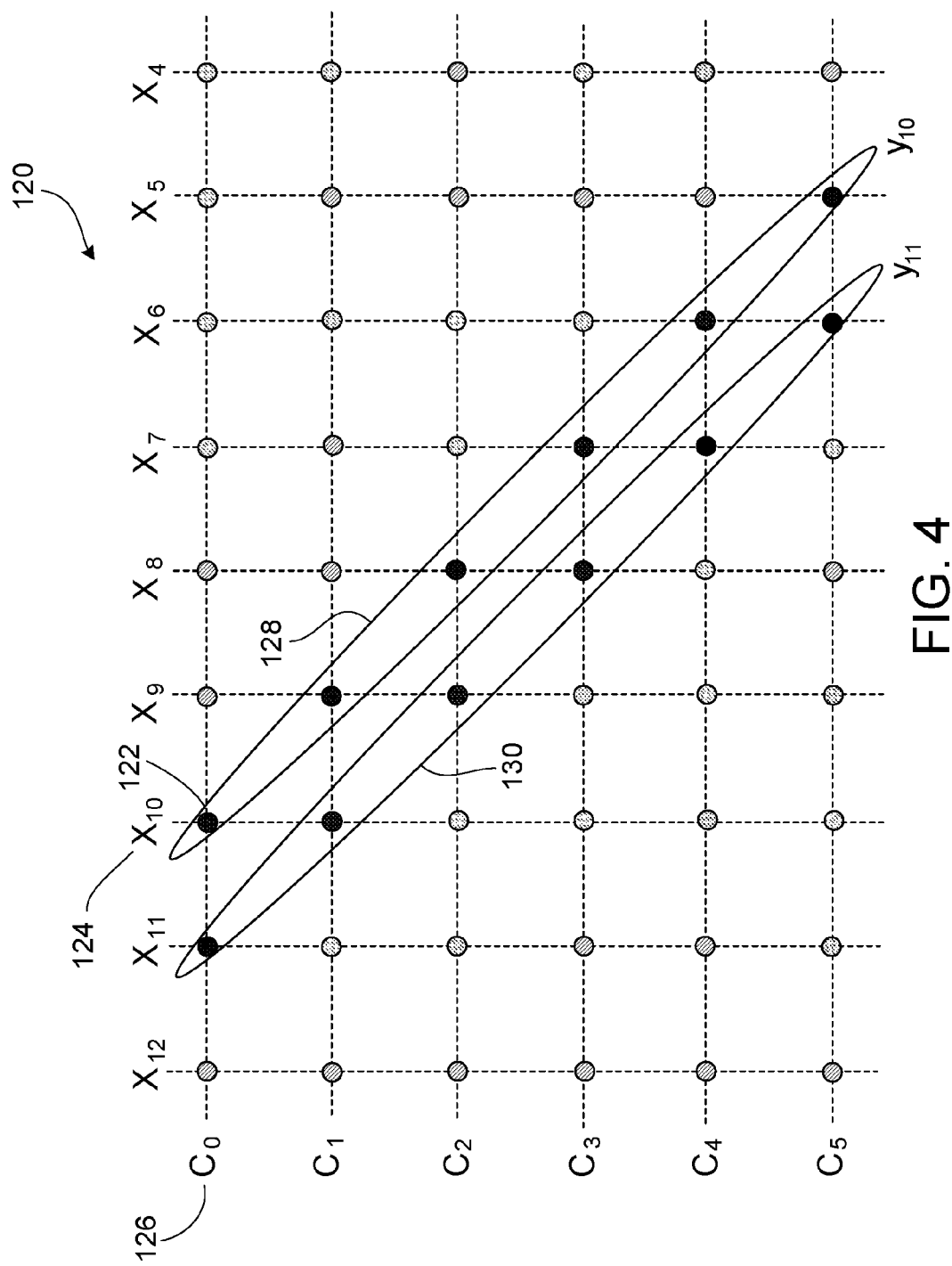
FIGS. 4 and 5 are diagrams of matrices having elements representing components of convolution computations.

Referring to FIG. 4, to illustrate how the calculations for the convolution can be performed efficiently by calculating the output terms $y_8$ and $y_9$ in parallel as a pair and then calculating $y_{10}$ and $y_{11}$ in parallel as a second pair, a matrix 120 is presented having columns representing filter inputs ($x_i$, i=4 to 12) and rows representing filter coefficients ($c_i$, i=0 to 5). Each dot (e.g., 122) at an intersection of a column of filter input (e.g., 124) and a row of filter coefficient (e.g., 126) represents a product of a filter input and a filter coefficient. In this example, the dot 122 represents $x_{10} \cdot c_0$. The term $y_{10}$ can be determined by calculating the sum of the products represented by the dots along a diagonal line 128, and the term $y_{11}$ can be determined by calculating the sum of the products represented by the dots along a diagonal line 130.

For example, $y_{10}$ includes the term $x_{10} * c_0$, and $y_{11}$ includes the term $x_{10} * c_1$. Thus, the operand $x_{10}$ can be used in both calculations. Similarly, $y_{10}$ includes the term $x_9 * c_1$, and $y_{11}$ includes the term $x_{10} * c_1$, so the operand $c_1$ can be used in both calculations. By calculating the components of $y_{10}$ and $y_{11}$ in parallel, and using the operands in the registers 144 in multiple calculations, the multipliers 148 can be more fully utilized, and less time is needed to load the operands into the registers 144.

The multipliers 148a to 148d in the CMAC unit 140 are paired so that the accumulators 150a and 150b add up partial products from each pair, allowing a single-cycle complex multiplication to be performed. The term "single-cycle complex multiplication" means that when the pipelines 152a and 152b are full, one output term is generated and accumulated at the output of the pipelines each cycle. The term "cycle" can mean a clock cycle or an operation cycle that includes more than one clock cycle.

A 32-bit operand has a 16-bit real term and a 16-bit imaginary term in the lower and upper halves, respectively, of the operand. The order of usage of operands in a complex math instruction is fixed. The instruction specifies the address for the two 32-bit operands, one for the filter input and the other for the filter coefficient. The address of an operand in the 8 deep register file 142 can be specified using 3 bits, and hence 6 bits can be used to specify the addresses of the two 32-bit operands. An additional 2 bits are used to specify one of the four conjugate operations described above. In this example, a total of 8 bits are used in the complex math instruction to specify the 32-bit operands and the conjugate operation.

The four 16-bit times 16-bit multipliers 148a to 148d calculate the intermediate terms of the multiplication operation, and two 48-bit adders 158a, 158b calculate the sum of the intermediate terms. The CMAC unit 140 adds the intermediate terms and loads operands from memory to fetch the next filter coefficient and filter input in parallel. The CMAC unit 140 has a pipeline structure so that in each cycle (e.g., clock cycle or operation cycle), new operands are loaded and a new output is generated and accumulated.

By comparison, in a conventional design, when the filter input and filter coefficient are both real numbers, only one multiplier 148 is typically used to multiply the two real numbers, and the other three multipliers 148 are idle. In the conventional design, when the filter input and filter coefficient include one real number and one complex number, only two multipliers 148 are typically used to multiply the real number and the real and imaginary parts of the complex number, and the other two multipliers 148 are idle. Thus, the CMAC unit 140 in FIG. 2 more fully utilizes the multipliers 148 than the conventional design.

The following describes a "quad scale" instruction set that allows the use of all four multipliers 148 when one or both of the filter input and filter coefficient are real numbers. The basic functionality of the quad scale instruction set is defined by the following operation:

$$Y_0 = X_0 \cdot c, Y_1 = X_1 \cdot c, Y_2 = X_2 \cdot c, Y_3 = X_3 \cdot c$$

where $x_0, \ldots, x_3$ conceptually are four independent variables and c is a common scalar. The four multiplications $x_0 * c$, $x_1 * c$, $x_2 * c$, and $x_3 * c$ are calculated by the four multipliers 148a to 148d in parallel. The variables $x_0$ to $x_3$ and the scalar c are specified as operands of the quad scale instruction. The goal is to arrange calculations into a series of parallel multiplications in the format above that can be performed by the four multipliers 148.

In some implementations, the quad scale multiplication instruction has two modes for specifying two allowed combinations of input registers. The syntax for the first mode of the multiplication instruction is:

$$A0.L+=Rx.L*Rz.[H|L]||A0.H+=Rx.H*Rz.[H|L]||$$

$$A1.L+=Ry.L*Rz.[H|L]||A1.H+=Ry.H*Rz.[H|L]||;$$

where A0.L represents the lower half of the output A0, A0.H represents the upper half of the output A0, A1.L represents the lower half of the output A1, A1.H represents the upper half of the output A1, Rx.L represents the lower half of the operand Rx, Rx.H represents the upper half of the operand Rx, Ry.L represents the lower half of the operand Ry, Ry.H represents the upper half of the operand Ry, Rz.L represents the lower half of the operand Rz, and Rz.H represents the upper half of the operand Rz.

The syntax for the second mode of the multiplication instruction is:

$$A0.L+=Rx.H*Rz.[L|H]||A0.H+=Rx.L*Rz.[L|H]||$$

$$A1.L+=Ry.H*Rz.[L|H]||A1.H+=Ry.L*Rz.[L|H].$$

As will be described later, the second mode is useful in performing a series of multiplications in which the operands are stored in two registers, such as Rx and Ry above, and during each cycle only one-half of the register is updated. For example, during a first cycle, the operands stored in Rx.H, Rx.L, Ry.H, and Ry.L are used. Also in the first cycle, a new number is loaded into Rx.H. In a second cycle, the operands stored in Rx.L, Ry.H, Ry.L, and Rx.H are used. A new number is loaded and is updated, in parallel, in which each multiplication involves a real number multiplied by a real number.

If each 16-bit operand is selected from the register file of 16 half-words, combined with a scalar operand, the total source selection payload will be 20 opcode-bits. The register file has 16 entries of 16-bit numbers, so each 16-bit operand has a 4-bit address. Four 16-bit operands need 16 bits for the addresses. The scalar also has a 4-bit address. Thus, 4×5=20 bits are needed for the selection of the four 16-bit operands and the 16-bit scalar in the register file 142.

If the operands are loaded into the register file 142 in a way such that the variables $x_0$ to $x_4$ are stored at consecutive addresses in the register file 142, then the number of bits needed for address decode can be reduced from 20 to 8 bits. The register file 142 can have eight 32-bit values, so each 32-bit value has a 3-bit address. By assuming that the variables $x_0$ to $x_4$ are stored at consecutive addresses in the register file 142, three bits can be used for the selection of ($X_0$, $X_1$, $X_2$, $X_3$) by specifying the address of the first 32-bit value in the register file 142. That address stores $x_0$ and $x_1$, and the following address stores $x_2$ and $x_3$. One bit is used for the selection between two modes of the quad scale instruction, and four bits are used for the selection of the scalar operand. Thus, a total of 3+1+4=8 bits are needed. Each of the two accumulators, A0 and A1, includes two halves (A0.L, A0.H, A1.L and A1.H), each half containing 24 bits representing a 9.15 fractional integer.

Case 1: Complex Input with Real Coefficients

The following describes the calculation of the convolution of Equation 1 using the CMAC unit 140, in which the filter inputs are complex numbers and the filter coefficients are real numbers. An instruction set is provided to allow two 32-bit complex filter inputs and one 16-bit scalar filter coefficient to be processed per clock cycle. In this example, two of the 32-bit registers 144 store two 32-bit complex filter inputs, and one of the 32-bit registers 144 stores two 16-bit real filter coefficients. When updating the contents of the registers 144, the real filter coefficients are loaded in pairs into the register, while the complex filter inputs are loaded into the registers one at a time (i.e., one filter input is updated in one clock cycle, another filter input is updated in the following clock cycle, and so forth). This design allows y(10) and y(11) to be calculated in parallel by using all four multipliers 148a to 148d. Some operands are reused, meaning that the same operand is used in more than one cycle. For example, an operand may be used in a multiplication in a first cycle, and used again in another multiplication in a second cycle.

Expressed in pseudo-assembly code, the code for the traversal of the matrix 120 in FIG. 4 can be modeled as follows:

$$R0=[x_{11r},x_{11i}] // X11 \text{ and } x10 \text{ contain the complex filter inputs}$$

$$R1=[x_{10r},x_{10i}]||R2=[c_1,c_0];$$

Here, register R0 stores the complex filter input $x_{11}$, including the real part $x_{11r}$ and the imaginary part $x_{11i}$. Register R1 stores the complex filter input $x_{10}$, including the real part $x_{10r}$ and the imaginary part $x_{10i}$. Register R2 stores the real filter coefficients $c_0$ and $c_1$. The registers R0, R1, and R2 in the pseudo-code above can correspond to, e.g., registers 144a, 144b, and 144c of the CMAC unit 140. The notation "//" indicates that the text after it are comments, while the notation "||" indicates parallel execution of instructions. Thus, register R2 is loaded with $c_1$ and $c_0$ at the same time that the register R1 is loaded with $x_{10r}$ and $x_{10i}$.

A software loop having the following instructions 1 and 2 can be executed:

Instruction 1:

$$A0.H+=R0.H*R2.L,A0.L+=R0.L*R2.L,$$

$$A1.H+=R1.H*R2.L,A1.L+=R1.L*R2.L$$

$$||R0=[x_{9r},x_{9i}];$$

// Uses (R0,R1) contents.

Instruction 2:

$$A0.H+=R1.H*R2.H,A0.L+=R1.L*R2.H,$$

$$A1.H+=R0.H*R2.H,A1.L+=R0.L*R2.H$$

$$||R1=[x_{8r},x_{8i}]||R2=[c_2,c_3];$$

// Uses (R1,R0) contents.

The instructions 1 and 2 above show that $x_{11}$, $x_{10}$, $x_9$, $x_8$, $c_0$, $c_1$, $c_2$, and $c_3$ are processed. The actual program code is written in a way such that different values are loaded into the registers during different loop iterations.

Instruction 1 provides the calculation of R0*R2.L and R1*R2.L and loading register R0 in parallel. Instruction 2 provides the calculation of R1*R2.H and R0*R2.H, loading register R1, and loading of $c_2$ and $c_3$ into register R2 in parallel.

In both instructions 1 and 2, the filter coefficient (a scalar operand) is specified with a unique address that requires 4 bits. The filter inputs (e.g., $x_{11}$ and $x_{10}$) are fetched from a 32 bit register pair. This pair can be decoded using a 3 bit address. In the first instruction above, the filter input data $x_{11}$ and $x_{10}$ are stored in registers R0 and R1, respectively. At the same time that $x_{11}*c_0$ and $x_{10}*c_0$ are calculated, the filter input $x_9=x_{9r}+x_{9i}$ is loaded into the register R0. In the second instruction, the filter input data $x_{10}$ and $x_9$ are stored in registers R1 and R0, respectively. At the same time that $x_{10}*c_1$ and $x_9*c_1$ are calculated, the filter input $x_8=x_{8r}+x_{8i}$ is loaded into the register R1, and the filter coefficients $c_2$ and $c_3$ are loaded into the register R2.

In this example, the second register storing the second operand is implied, thus reducing the address payload to 3 bits from 6 bits. In the two instructions above, the mode bit is set to "0" indicating that the first mode of the multiplication instruction is used. When a complex number $x_{11}$ is stored in the register, the real part is stored in the higher half of the register, and the imaginary part is stored in the lower part of the register. Thus, the first mode of the multiplication instruction results in $A0.H+=x_{11r}*c_0$, $A0.L=x_{11i}*c_0$.

The software loop allows the calculation of y11 and y10 to be performed in an iterative process in which pairs of terms $(x_9*c_2, x_8*c_2)$, $(x_8*c_3, x_7*c_3)$, $(x_7*c_4, x_6*c_4)$, $(x_6*c_5, x_5*c_5)$ are calculated similarly as described above. At the end of the computation, when we finish traversing the matrix along the diagonal lines 128 and 130, (A0.H, A0.L) will store the complex sum of the product $y_{11}=x_{11}*c_0+x_{10}*c_1+x_9*c_2+x_8*c_3+x_7*c_4+x_6*c_5$ (in which A0.H stores the real part and A0.L stores the imaginary part), and (A1.H, A1.L) will store the complex sum of the product $y_{10}=x_{10}*c_0+x_9*c_1+x_8*c_2+x_7*c_3+x_6*c_4+x_5*c_5$ (in which A1.H stores the real part and A1.L stores the imaginary part).

Case2: Real Input with Real Coefficients

When the filter inputs and the filter coefficients are all real numbers, the inventors realized that some of the operands are used in calculating $y_8$, $y_9$, $y_{10}$, and $y_{11}$. Thus, instead of calculating $y_8$, $y_9$, $y_{10}$, and $y_{11}$ one after the other, it is more efficient to calculate $y_8$ to $y_{11}$ in parallel and reuse the operands in the calculations.

Figure 5:
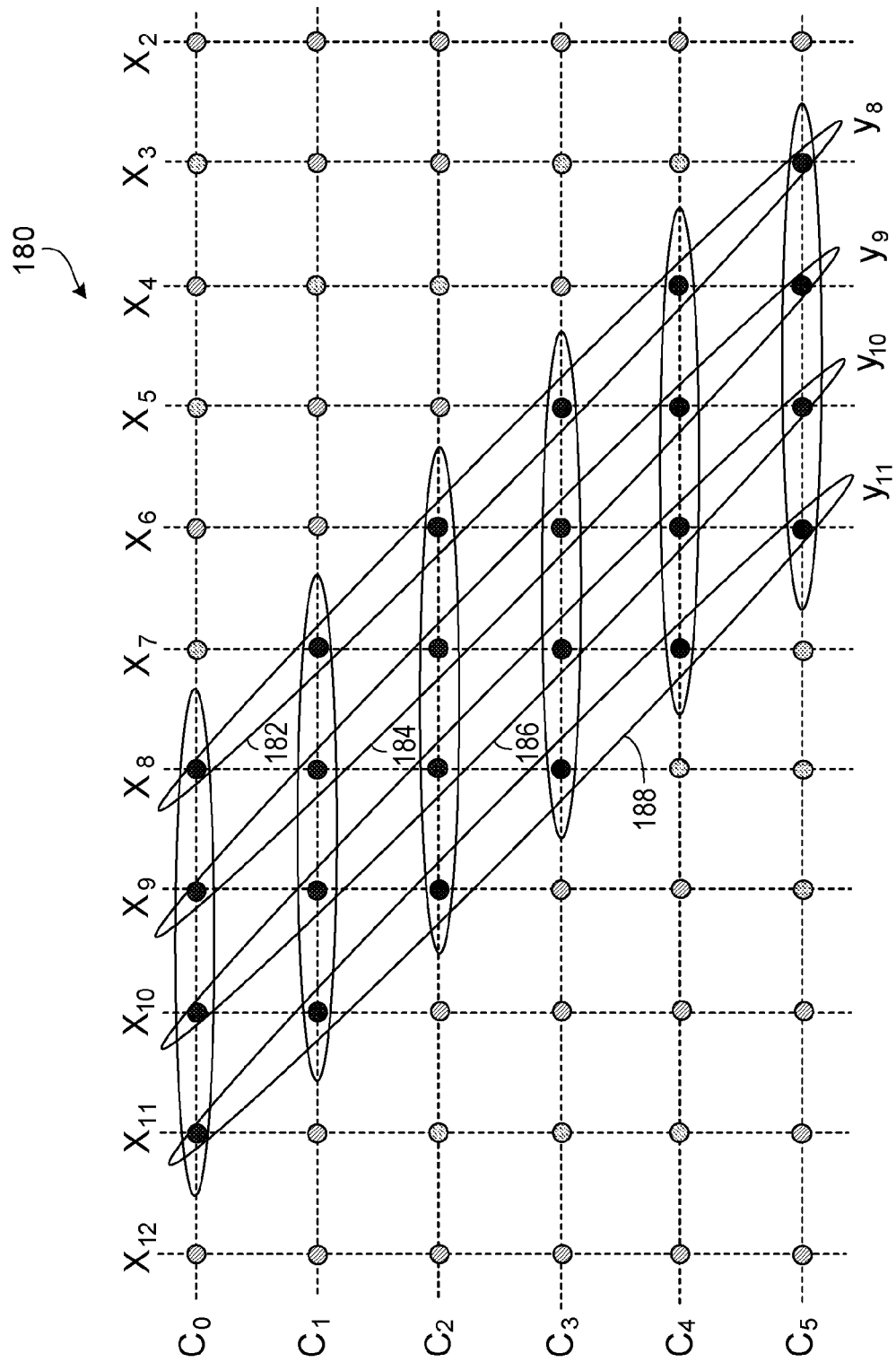

Referring to FIG. 5, to illustrate how the calculations for the convolution can be performed efficiently by calculating the components of four output terms $y_8$ to $y_{11}$ in parallel, a matrix 180 is presented, similar to the matrix 120 of FIG. 4. The terms $y_8$, $y_9$, $y_{10}$, and $y_{11}$ can be determined by calculating the sum of the products represented by the dots along diagonal line 182, 184, 186, and 188, respectively.

It is efficient to calculate the components of $y_{11}$, $y_{10}$, $y_9$, and $y_8$ in parallel because some operands are common to the computation of $y_{11}$ to $y_9$, and four multipliers 148 are available to perform the multiplications. For example, $y_{11}$ includes the term $x_8*c_3$, $y_{10}$ includes the term $x_8*c_2$, $y_9$ includes the term $x_8*c_1$, and $y_8$ includes the term $x_8*c_0$. Thus, the operand $x_8$ can be used in all four calculations. Similarly, $y_{11}$ includes the term $x_8*c_3$, $y_{10}$ includes the term $x_7*c_3$, $y_9$ includes the term $x_6*c_3$, and $y_8$ includes the term $x_5*c_3$, so the operand $c_3$ can be used in all four calculations. By calculating the components of $y_{11}$ to $y_8$ in parallel, and loading an operand in the register for use in four multiplications, the multipliers 148 can be more fully utilized, and less time is needed to load the operands into the registers 144.

The following describes calculation of the convolution of Equation 1 using the CMAC unit 140, in which both the filter inputs and the filter coefficients are real numbers. An instruction set is provided to allow four 16-bit real filter inputs and one 16-bit scalar filter coefficient to be processed per clock cycle. In this example, two of the 32-bit registers 144 store two 16-bit real filter inputs, and one of the 32-bit registers 144 stores two 16-bit filter coefficients. When updating the contents of the registers 144, the real number filter coefficients are loaded in pairs into the register. This design allows $y_8$ to $y_{11}$ to be calculated in parallel by using all four multipliers 148a to 148d, with reuse of operands.

Expressed in pseudo-assembly code, the code for the traversal of the matrix 180 in FIG. 5 can be modeled as follows:

$R0=[x_{11},x_{10}]$;

$R1=[x_9,x_8]\|R2=[c_1,c_0]$;

A software loop having the following instructions can be executed:

$A0.H+=R0.H*R2.L, A0.L+=R0.L*R2.L$, $A1.H+=R1.H*R2.L, A1.L+=R1.L*R2.L$ $\|R0.H=[x_7]$;

// Mode bit=0, reg pair used (R0,R1)
// Traverses row1 of Matrix $A0.H+=R0.L*R2.H, A0.L+=R1.H*R2.H$, $A1.H+=R1.L*R2.H, A1.L+=R0.H*R2.H$ $\|R0.L=[x_6]\|R2=[c_3,c_2]$;

// Mode bit=1, reg pair used (R0,R1)
// Traverses row2 of Matrix $A0.H+=R1.H*R2.L, A0.L+=R1.L*R2.L$, $A1.H+=R0.H*R2.L, A1.L+=R0.L*R2.L$ $\|R1.H=[x_5]$;

// Mode bit=0, reg pair used (R1,R0)
// Traverses row3 of Matrix $A0.H+=R1.L*R2.H, A0.L+=R0.H*R2.H$, $A1.H+=R0.L*R2.H, A1.L+=R1.H*R2.H$ $\|R1.L=[x_4]\|R2=[c_5,c_4]$;

// Mode bit=1, reg pair used (R1,R0)
// Traverses row4 of Matrix

The instructions above show that $x_{11}$, $x_{10}$, $x_9$, $x_8$, $x_7$, $c_0$, $c_1$, $c_2$, and $c_3$ are processed. The actual program code is written in a way such that different values are loaded into the registers during different loop iterations.

The first two instructions will traverse the first two rows of the matrix. The first instruction uses the first mode of the quad scale instruction, and the second instruction uses the second mode of the quad scale instruction. The subsequent instructions work on implied pair (R1, R0) and use the mode bit in a similar manner. In this example, 8 bits are used to decode the bits for register mapping.

At the end of the computation:

$A0.H$ stores $y_{11}=x_{11}*c_0+x_{10}*c_1+x_9*c_2+x_8*c_3+x_7*c_4+x_6*c_5$, $A0.L$ stores $y_{10}=x_{10}*c_0+x_9*c_1+x_8*c_2+x_7*c_3+x_6*c_4+x_5*c_5$, $A1.H$ stores $y_9=x_9*c_0+x_8*c_1+x_7*c_2+x_6*c_3+x_5*c_4+x_4*c_5$, and $A1.L$ stores $y_8=x_8*c_0+x_7*c_1+x_6*c_2+x_5*c_3+x_4*c_4+x_3*c_5$.

Thus the complex math and quad scale instructions allow for a uniform implementation for all three cases of FIR filter convolution (i.e., complex filter inputs and complex filter coefficients, complex filter inputs and real filter coefficients, and real filter inputs and real filter coefficients). The pseudo-assembly code for complex filter input times complex filter coefficient is as follows:

$A0.H{+}{=}R0.H{*}R2.H, A0.L{+}{=}R0.L{*}R2.L,$ $A1.H{+}{=}R0.H{*}R2.L, A1.L{+}{=}R0.L{*}R2.H$ $\|R0{=}[x_r,x_i]|R2{=}[c_r,c_i]$

Mode switches can be used to differentiate between the different instructions. The software loops are similar in all cases and use all 4 multipliers in every cycle. At a programming level, the new instructions still use 8 bits for specifying all input operand combinations.

The examples above show that a digital FIR filter can be implemented using a MAC unit having four multipliers (each capable of multiplying two 16-bit numbers) and three 32-bit registers. By carefully designing how the operands are loaded into the registers and arranging the sequence of multiplications, it is possible to fully use the four multipliers for the following three cases: (1) complex filter inputs and complex filter coefficients, (2) complex filter inputs and real filter coefficients, and (3) real filter inputs and real filter coefficients.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems.

For example, the number of bits for each entry in the register file 142, the number of bits of the registers 144, the number of bits that can be handled by the multipliers 148, the number of bits of the adders 158, and the number of bits of the accumulators 162 can be different from those described above. The multiplier-accumulator unit can be used in computations other than convolution.

Accordingly, other implementations are within the scope of the following claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus comprising:
  a processor to calculate a convolution of a first input sequence of numbers with a second input sequence of numbers to generate an output sequence, the processor comprising:
    multipliers, each multiplying two numbers to generate an output;
    multiplexers to direct the numbers in the first and second input sequences or parts of the numbers to the multipliers;
    control circuitry to control the multiplexers to direct the first and second input sequences of numbers to the multipliers dependent on whether the numbers are complex or real,
      in which when each of the first sequence of numbers is a complex number and each of the second sequence of numbers is a real number, the control circuitry controls the multiplexers to direct the first and second input sequences of numbers to the multipliers to enable a first multiplication and a second multiplication to be performed in parallel, the first multiplication comprising a first complex number in the first input sequence multiplied by a real number in the second input sequence, and the second multiplication comprising a second complex number in the first input sequence multiplied by the real number in the second input sequence; and
    an accumulator to add partial products from the multiplications to calculate the convolution.

2. The apparatus of claim 1 in which the processor further comprises a first register to store the first complex number in the first input sequence, a second register to store the second complex number in the first input sequence, and a third register to store the real number in the second input sequence.

3. The apparatus of claim 2 in which the control circuitry controls the multiplexers to direct the real number to each of a first multiplier, a second multiplier, a third multiplier, and a fourth multiplier, and controls the multiplexers to direct a real part of the first complex number to the first multiplier, direct an imaginary part of the first complex number to the second multiplier, direct a real part of the second complex number to the third multiplier, and direct an imaginary part of the second complex number to the fourth multiplier.

4. The apparatus of claim 1 in which when each of the first sequence of numbers is a real number and each of the second sequence of numbers is a real number, the control circuitry controls the multiplexers to direct the first and second input sequences of numbers to the multipliers to enable a first multiplication of a first real number in the first input sequence with a real number in the second input sequence, a second multiplication of a second real number in the first input sequence with the real number in the second input sequence, a third multiplication of a third real number in the first input sequence with the real number in the second input sequence, and a fourth multiplication of a fourth real number in the first input sequence with the real number in the second input sequence, the first, second, third, and fourth multiplications being performed in parallel.

5. The apparatus of claim 1 in which the processor further comprises pipeline stages for calculating the convolution, and each of the pipeline stages comprises one multiplier of the multipliers and one multiplexer of the multiplexers such that for a portion of the time each of the pipeline stage generates a partial product per operating cycle.

6. The apparatus of claim 5 in which the processor further comprises registers to store some of the first and second input sequences of numbers, and the control circuitry controls the multiplexers to direct the numbers stored in the registers to the multipliers.

7. The apparatus of claim 6 in which when each of the first and second sequences of numbers is a complex number, the control circuitry controls loading of one or more of the first and second input sequences of numbers into the registers and controls the multiplexers to direct the first and second input sequences of numbers to the multipliers to enable outputting a product of a complex number in the first input sequence and a complex number in the second input sequence every cycle for a period of time.

8. The apparatus of claim 1 in which the first input sequence of numbers comprise input samples to a digital filter, the second input sequence of numbers comprise filter coefficients, and the output sequence comprises an output of the digital filter in response to the input samples.

9. A method of calculating a convolution of a first input sequence of numbers with a second input sequence of numbers to generate an output sequence, the method comprising:
  identifying a first input sequence of numbers and a second input sequence of numbers;

directing the first and second input sequences of numbers to a plurality of multipliers according to whether the numbers are complex or real, each multiplier capable of multiplying two numbers to generate an output;

when each of the first sequence of numbers is a complex number and each of the second sequence of numbers is a real number, directing a first complex number in the first input sequence of numbers, a second complex number in the first input sequence of numbers, and a real number in the second input sequence of numbers to the multipliers, and performing a first multiplication and a second multiplication in parallel, the first multiplication comprising multiplying the first complex number in the first input sequence with the real number in the second input sequence, the second multiplication comprising multiplying the second complex number in the first input sequence with the real number in the second input sequence; and accumulating partial products to calculate a convolution of the first input sequence and the second input sequence.

10. The method of claim 9 in which the first input sequence of numbers comprise input samples to a digital filter, the second input sequence of numbers comprise filter coefficients, and the convolution represents an output of the digital filter in response to the input samples.

11. A method of multiplying numbers, the method comprising:

identifying a first input sequence of numbers and a second input sequence of numbers;

directing the numbers in the first and second input sequences or parts of the numbers to a plurality of multipliers according to whether the numbers are complex or real, each multiplier capable of multiplying two numbers to generate an output;

when each of the first sequence of numbers is a complex number and each of the second sequence of numbers is a real number, directing a first complex number in the first input sequence of numbers, a second complex number in the first input sequence of numbers, and a real number in the second input sequence of numbers to the multipliers, and performing a first multiplication and a second multiplication in parallel, the first multiplication comprising multiplying the first complex number in the first input sequence with the real number in the second input sequence, the second multiplication comprising multiplying the second complex number in the first input sequence with the real number in the second input sequence.

12. The method of claim 11 in which the first input sequence of numbers comprise input samples to a digital filter, the second input sequence of numbers comprise filter coefficients.

13. The method of claim 12, further comprising accumulating partial products to calculate a convolution of the first input sequence and the second input sequence, the convolution representing an output of the digital filter in response to the input samples.

14. An apparatus comprising:

a processor to calculate a convolution of input samples with filter coefficients to generate a filter output response, the processor comprising a multiplier-accumulator unit that comprises:

multipliers, each to multiply a first input number and a second input number to generate a product;

multiplexers to receive the input samples and the filter coefficients and to direct the input samples and filter coefficients to the multipliers according to instruction codes specifying a computation mode, in which the processor is capable of executing instructions to perform computation in at least two computation modes:

in a first computation mode, each input sample is a complex number and each filter coefficient is a complex number, and the multiplexers direct the input samples and filter coefficients to the multipliers to enable multiplication of a complex input sample with a complex filter coefficient;

in a second computation mode, each input sample is a complex number and each filter coefficient is a real number, and the multiplexers direct the input samples and filter coefficients to the multipliers to enable a first multiplication of a first complex input sample with a real filter coefficient, and a second multiplication of a second complex input sample with the real filter coefficient, the first and second multiplications performed in parallel.

15. The apparatus of claim 14 in which the processor is capable of executing instructions to perform computation in a third computation mode in which each input sample is a real number and each filter coefficient is a real number, and the multiplexers direct the input samples and filter coefficients to the multipliers to enable a first multiplication of a first real input sample with a real filter coefficient, a second multiplication of a second real input sample with the real filter coefficient, a third multiplication of a third real input sample with the real filter coefficient, and a fourth multiplication of a fourth real input sample with the real filter coefficient, the first, second, third, and fourth multiplications performed in parallel.

16. The apparatus of claim 15 in which the multiplier-accumulator unit further comprises four multipliers, and in the third computation mode, the multiplexers direct the real filter coefficient to each of the four multipliers, direct the first real input sample to a first one of the four multipliers, direct the second real input sample to a second one of the four multipliers, direct the third real input sample to a third one of the four multipliers, and direct the fourth real input sample to a fourth one of the four multipliers.

17. The apparatus of claim 15 in which the multiplier-accumulator unit further comprises registers to store operands, and the multiplexers direct the operands or parts of the operands to the multipliers.

18. The apparatus of claim 17 in which in the first computation mode, one of the registers stores one complex input sample, and in the third computation mode, the register stores two real input samples.

19. The apparatus of claim 14 in which the multiplier-accumulator unit further comprises at least four multipliers.

20. The apparatus of claim 19 in which in the second computation mode, the multiplexers direct the real filter coefficient to each of the four multipliers, direct a real part of the first complex input sample to a first one of the four multipliers, direct an imaginary part of the first complex input sample to a second one of the four multipliers, direct a real part of the second complex input sample to a third one of the four multipliers, and direct an imaginary part of the second complex input sample to a fourth one of the four multipliers.

21. The apparatus of claim 14 in which the multiplier-accumulator unit further comprises registers to store operands, and the multiplexers direct the operands or parts of the operands to the multipliers.

22. The apparatus of claim 21 in which in the second computation mode, one of the registers stores one complex input sample and another one of the registers stores two real filter coefficients.

23. The apparatus of claim 14 in which the multiplier-accumulator unit further comprises pipeline stages, and each of the pipeline stages comprises one multiplier of the multipliers and one multiplexer of the multiplexers.

24. The apparatus of claim 14 in which the multiplier-accumulator unit uses an input sample to calculate an intermediate product of a first term of the filter output response in a first cycle, and reuses the same input sample to calculate an intermediate product of a second term of the filter output response in a second cycle.

* * * * *